Figure 1:
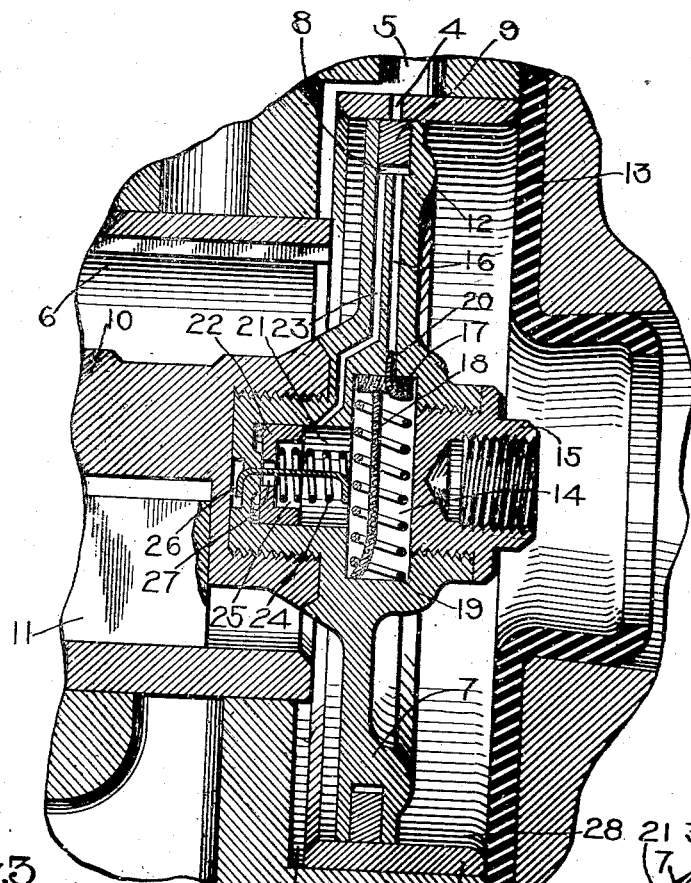

Sept. 17, 1946.            S. G. DOWN            2,407,872
                          PISTON DEVICE
                       Filed Oct. 22, 1942

INVENTOR
Sidney G. Down
BY
ATTORNEY

UNITED STATES PATENT OFFICE 2,407,872

PISTON DEVICE

Sidney G. Down, Edgewood, Pa., assignor to The Westinghouse Air Brake Company, Wilmerding, Pa., a corporation of Pennsylvania Application October 22, 1942, Serial No. 462,907

6 Claims. (Cl. 184—18)

This invention relates to automatically controlled lubricating means for periodically supplying lubricant to a plurality of cooperating sliding surfaces such as those of a piston and a cylinder wall, and more particularly to the type of lubricating means suitable for use in lubricating the pistons and cylinder walls of brake controlling devices for fluid pressure brakes.

It is especially desirable with controlling devices for fluid pressure brakes to maintain a consistent minimum of friction between the piston and packing ring and the bushing in which they are reciprocable in response to variations in the pressure of fluid on opposite sides of the piston. Limited and periodic lubrication has been found to be one of the best methods for maintaining this minimum of friction over an extended period of time and the provision of novel means whereby this is accomplished is one of the objects of this invention.

One method for providing automatic lubrication over an extended period of time is by feeding lubricant through capillary attraction means to the cylinder walls and the periphery of the piston at a slow continuous rate. This method has a disadvantage in that it is difficult to meter the supply of lubricant at a slow enough rate to provide the desired lubrication. Also, the flow continues at substantially the same rate regardless of the extent of active service the valve device has experienced. Thus, a rate of flow of lubricant that is barely sufficient for a valve device in highly active service would be excessive and harmful in another in inactive service. An excess of lubricant has a tendency to collect dirt or get gummy thereby increasing the friction between the piston and cylinder bushing to an abnormal degree.

In other methods a breather port to convey the lubricant from a wick, capillary tube or the like to the piston ring groove is employed. This port acts, upon a reduction in pressure of the fluid in the brake pipe in a train brake system, to direct the resulting flow of fluid from a lubricant reservoir in the piston to the ring groove across or through a lubricant collecting and dispensing element and in the direction of the ring groove. These methods though they maintain a relation between the rate of feed of lubricant and the activity of the valve device, too frequently provide an undesirable excess of lubricant to the friction surfaces.

It is the object of my invention, to correlate the rate of feed of lubricant with a periodic function which occurs at less frequent intervals by nullifying the breather action and thereby the lubrication of the parts during service applications of the valve device and rendering it effective only during emergency applications. In this manner it will be possible to supply a smaller amount of lubricant to the friction surfaces. Periodic operation is assured since the emergency application of the valve device is rarely used during the interval of a train trip and is consistently used when the car is set on a railroad siding.

To effect the above objects an inertia or fluid pressure controlled element may be used in combination with breather type lubrication means to render the lubrication means operative only during an emergency application of the train brakes. The piston of the brake controlling valve device is provided with an additional or breather passage which is preferably arranged parallel to the lubricant conducting passage between the lubricant reservoir and the ring groove and which by-passes the lubricant conducting passage and renders it substantially ineffective during service applications.

The piston is further provided with an inertia element in the form of a cylindrical valve adapted to close off the breather passage when the piston is moved rapidly and stopped abruptly as during an emergency application of the brakes. The continued reduction of the pressure of fluid outside the ring groove causes the fluid in the lubricant reservoir to flow to the ring groove through the lubricant conducting passage carrying with it the lubricant that has collected in the port by capillary attraction.

Figure 3:
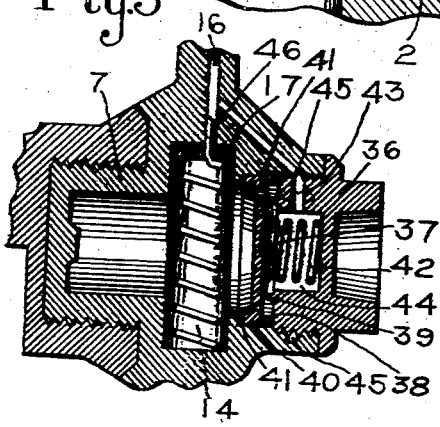
Figure 2:
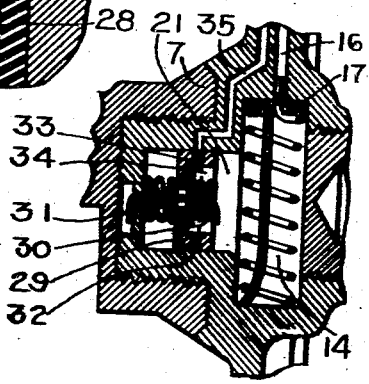

In the accompanying drawing Fig. 1 is a fragmentary sectional view of an emergency portion of the type employed in the "AB" type of railway car brake equipment showing the invention embodied therein; Fig. 2 is a fragmentary sectional view showing a modification of the invention; and Fig. 3 is a sectional view similar to Fig. 2 but showing another modification of the invention.

As shown in Fig. 1, the emergency portion of the equipment may comprise a brake controlling valve device having a bushing 1 which is of the usual tubular form and may be made of any suitable material, such as brass or molded plastic composition. This bushing is adapted to be pressed into a suitable bore 2 in the casing 3. The bushing is provided with a charging port 4 which connects with a passage 5 leading to a valve chamber 6 and with the usual quick action chamber not shown.

Slidably mounted in the bushing for reciprocatory motion relative thereto is a piston 7 having a groove 8 formed in the periphery thereof, in which groove is mounted the usual packing ring 9 which may be of any suitable material such as brass, and which, due to its inherent resiliency, is pressed outwardly into close frictional engagement with the inner friction surface of the bushing 1.

The piston is provided with a stem 10 which is adapted to operate the usual emergency slide valve 11, and is provided on its face with a bead 12 which is adapted to engage a gasket 13 at the end of the cylinder. The piston is also provided with a centrally located lubricant storage reservoir 14 in which a suitable amount of lubricant is carried, which lubricant is supplied to the chamber through an opening provided in the front face of the piston, the opening being normally closed by means of a plug 15 having an air tight screw-threaded connection with the piston.

The piston is further provided with a lubricant conducting passage 16 extending radially upward from the reservoir 14 to the bottom of the ring groove 8. This passage is for the purpose of permitting the flow of lubricant to the groove 8 under certain conditions to be more fully described.

Contained in the reservoir 14 and covering the inner end of the passage 16 is a lubricant collecting and storage element 17 to which lubricant is supplied by a wick 18. The lubricant collecting and storage element 17 comprises a disc of compressible material such as felt and is engaged by a spring 19 which serves two purposes; first, to maintain the element in its proper relation to the passage 16, and second, to compress the element the amount necessary to limit its lubricant collecting and storage capacity to the requisite amount. The upper end 29 of the spring 19 is turned upwardly so that it extends through the storage element and into the passage 16, thus positioning the element 17 with relation to the passage. The lower end of this spring is seated on the bottom of the reservoir 14.

The wick 18 is preferably integrally attached to the element 17 and preferably extends from the element to the bottom of the lubricant reservoir 14. This wick conducts the lubricant from the main supply to the element by capillary attraction.

The piston is further provided with an axial bore 21 in which is carried a cylindrical inertia element 22. This bore 21 joins the posterior of the lubricant reservoir 14 and is also in communication with the ring groove 8 by means of a by-pass passage 23.

The by-pass passage 23 extends radially upward from the axial bore 21 to the groove 8 and for the greater portion of its length is parallel to the lubricant conducting passage 16. This passage 23 joins the axial bore 21 at a point a short distance to the left of the juncture of the bore and the reservoir 14, where it may be sealed off by the inertia element 22 upon its movement out of normal position toward the front of the piston, thus the element serves as a valve for controlling communication between the passage 23 and the bore 21.

The inertia element 22 is normally held against the back end of the bore 21 by means of a light spring 24, which is seated in a central recess 25 provided in the element. The right hand end 26 of the spring 24 is doubled back so that it extends along the axis of the spring to its opposite end where it passes through a hole 27 in the inertia element and then into a recess formed in the piston where it is anchored in the piston as shown.

When the brake controlling valve device is placed in service, the pressure of fluid supplied by way of the usual brake pipe, not shown, and acting on the face of the piston 7 will be increased and will move the piston in the direction toward the left-hand as viewed in Fig. 1 until the charging port 4 is uncovered to the chamber 28 at the face of the piston. Fluid will flow by way of the charging port 4 and the passage 5 to the valve chamber 6 behind the piston.

At the same time fluid will flow at a slow rate past the periphery of the piston and through the necessary clearance space between the packing ring and the piston to the open space defined by the inner surface of the ring and the bottom of the ring groove 8 and from thence flows through the passage 23 and bore 21 to the lubricant reservoir 14, thus slowly increasing the pressure of fluid in the reservoir to substantially the same pressure as that acting on the face of the piston. From this space, fluid under pressure may also flow by way of the passage 16 to the reservoir 14 but due to the resistance offered by the element 17 to such flow the major portion of the flow will be by way of passage 23.

To effect an emergency application of the brakes in a train of railway cars the pressure of fluid in the train brake pipe and in piston chamber 28 at the face of the piston is rapidly reduced to preferably atmospheric pressure. Upon such a reduction in brake pipe pressure the fluid pressure in the chamber 6, located to the left of the piston, propels the piston forwardly rapidly until it strikes the gasket 13 at the right hand end of the chamber 28, thus bringing the piston to an abrupt stop. The slide valve 11, which is actuated by the piston, comes to a stop with the piston in a position wherein, in the emergency portion of a fluid pressure brake equipment of the "AB" type, connections are established by which the fluid under pressure in the chamber 6 is vented to atmosphere at a certain slow rate.

When the piston is stopped abruptly as just described, the inertia element 22 continues to move forwardly in its bore 21 relative to the now stationary piston and against the opposing pressure of the spring 24 and covers the mouth of the by-pass passage 23. Since the fluid in the lubricant reservoir 14 is at a higher pressure than that outside of the piston ring, fluid will flow from the reservoir through the lubricant saturated element 17 and the lubricant conducting passage 16 to the ring groove, and from thence will flow past the packing ring to the periphery of the piston and to chamber 6, the flow to brake pipe having been blocked off at this time by the bead 12 of the piston making a sealing engagement with the gasket 13.

The fluid as it passes through the lubricant saturated element 17, picks up a portion of the lubricant and carries or forces it through the passage 16 to the piston packing ring groove 8 and against the rear and side surfaces of the packing ring.

Lubricant thus supplied to the groove 8 will flow within the groove along the piston so as to supply lubricant throughout the entire circumference of the piston.

The piston packing ring 9 fits the ring groove 8 closely, hence lubricant deposited on the ring will flow by capillary attraction to the outer friction surface of the ring and to the friction surface of bushing 1. As the piston is reciprocated during subsequent service operations, the lubricant will be spread evenly over the cooperating surfaces of the ring and bushing.

It will be noted that during service applications of the brake the reductions in the pressure of the fluid in the brake pipe are not at such a rapid rate, nor to such an amount as those of emergency applications. Therefore the emergency piston 7 will not strike the gasket 13 and the inertia element 22 will not be moved out of its normal position, consequently the by-pass passage 23 will be open. Fluctuations in pressure of the fluid on the face of piston will not create any substantial pressure differential across the lubricant storage element 17 since the pressure of fluid in the lubricant reservoir and pressure of fluid in the ring groove will be equalized by a less restricted flow through passage 16.

It has been found in practice that it is not difficult to conduct an over-supply of lubricant to the parts to be lubricated, the difficulty being in limiting the supply to the small amount which it has been ascertained is sufficient to maintain the frictional resistance offered by the cooperating parts substantially low and constant.

By limiting the lubricant supplying times to emergency operations of the emergency portion of the equipment the amount of lubricant supplied to the cooperating surfaces will not be excessive.

In Fig. 2 a modification of the inertia element arrangement is illustrated. In this arrangement relative movement between the piston 7 and the inertia element is provided when the piston starts suddenly or is brought to an abrupt stop.

As illustrated, the inertia element is indicated by the reference numeral 29 and is located intermediate the ends of the axial bore 21 by means of light compression springs 30 and 31. The element is provided in the middle area of the periphery with an annular groove 32 from which a series of passages 33 extend radially inward to communicate with the central spring well 34 of the element 29, which communicates with bore 21 and lubricant reservoir 14. In normal position of the inertia element the groove 32 registers with the by-pass passage 35 in the body of the piston.

When the pressure of fluid in the brake pipe is reduced at a moderate rate, as during a service application of the brakes, the piston will change its position slowly and without sudden starting and stopping. Thus, during service applications, there will be no relative movement between the piston and element and as a result the pressures in the lubricant reservoir 14 and the ring groove 8 will be equalized, so that the lubricant passage 16 is rendered ineffective.

However, when the pressure in the brake pipe is reduced rapidly, as for instance during an emergency application, the piston will start to move suddenly. As a result, the inertia element 29 will move to the left, covering by-pass passage 35 and interrupting any flow of fluid therethrough. Lubricant will be carried to the ring groove 8 as previously described. When the piston is stopped suddenly the function will be the same as that described for Fig. 1. In passing from the extreme left end of axial bore 21 to the extreme right end, groove 32 in the element 29 will connect briefly with passage 35. Because of the rapid movement, the interval of communication between the groove 32 and the passage 35 will be so short as to be negligible.

In Fig. 3 another modification of my invention is shown wherein a pneumatically controlled valve is provided which is operative only during emergency applications of the brake.

In this form of my invention the filling plug 36 for the lubricant reservoir 14 is modified to make a sealing engagement with a valve 37 which is interposed between the lubricant chamber and a passage which by-passes the lubricant collecting and storage element 17 and permits the equalization of the fluid pressures in the lubricant carrying passage 16 and the lubricant reservoir 14. The valve 37 is preferably of the disc type having a guiding skirt 40 and is carried in a cylindrical chamber 38 in the piston body, into which chamber the filling plug 36 also extends. The valve is provided with the necessary number of flow restrictive openings 41 extending through that portion of the disc which is outside the seating area. An annular seat rib 39 is provided at the inner end of plug 36 for engaging the valve 37 which is held out of engagement by a spring 42 contained in a central recess 44 in the plug. The plug 36 is also provided with passages 43 extending radially outward from the chamber 44 to connect with an annular groove 45 in the piston body, when the plug 36 is screwed tightly into the piston, the groove communicating with a by-pass passage 46 leading from the lubricant carrying passage 16. Thus, free communication is normally established between the ring groove 8 and the lubricant reservoir 14 by way of the lubricant carrying passage 16 and also by way of openings 41 in valve 37 to chambers 38 and 44 which communicate by way of passages 43 in plug 36, groove 45 in the piston body 7, and by-pass passage 46 to lubricant carrying passage 16.

During service brake applications, when the pressure of fluid in the train brake pipe is reduced at a rate, to effect a service application of the brakes, valve 37 will remain in its normal unseated position, since the openings 41 are of sufficient flow capacity to permit fluid to flow at the same rate from the chamber 38. But when fluid pressure in the train brake pipe is reduced rapidly, as during an emergency application of the brakes, fluid under pressure will be conducted away from chamber 38 by way of chamber 44, passages 43, groove 45, by-pass passage 46 and lubricant conducting passage 16 to the ring groove 8 more rapidly than it can flow through the restrictive openings 41 in the valve 37. Consequently pressure of fluid acting on the right hand side of valve 37 will be reduced to the extent that the pressure of fluid acting on the left hand side of valve 37 will overcome the opposing pressure of the spring 42 and the valve will make a sealing engagement with the seat rib 39. This will interrupt any further flow of fluid through the openings 41 and enough differential in fluid pressure will be developed across the lubricant storage element 17 to initiate a flow of fluid therethrough carrying lubricant to the ring groove 8.

From the foregoing description it will be apparent that with each form of the invention disclosed the piston will be lubricated only when an emergency application of the brakes is being effected thereby avoiding the delivery of excessive lubricant to the parts to be lubricated.

Having now described my invention, what I claim as new and desire to secure by Letters Patent, is:

1. In a lubricating apparatus for the cooperating friction surfaces of two members, at least one of which is movable relative to the other, a fluid pressure chamber to which a surface of the movable member is exposed and in which the pressure of fluid may be varied, a lubricant storage reservoir formed in said movable member and adapted to receive a lubricant, a passage leading from said reservoir to at least one of said surfaces and to said chamber, said passage constituting a communication through which fluid under pressure may flow from said lubricant storage reservoir in response to a reduction in the pressure of fluid in said chamber, means adapted to supply lubricant from said lubricant storage reservoir to the fluid which flows from the reservoir to said passage, a second passage leading from said lubricant storage reservoir to the surface to be lubricated and to said chamber, said second passage constituting a communication of less restricted flow capacity than the first mentioned communication through which fluid under pressure may breathe into and out of said reservoir in response to variation in the pressure of fluid in said chamber, and said second passage being normally open so as to inhibit the flow of fluid and thereby the lubricant through the first mentioned passage, and inertia means operative upon a sudden change in the speed of said movable member for inhibiting the flow of fluid from said reservoir to said second passage, so that fluid flows from the reservoir to the first mentioned passage.

2. In a lubricating apparatus for the cooperating friction surfaces of two members, at least one of which is movable relative to the other, a fluid pressure chamber to which a surface of the movable member is exposed and in which the pressure of fluid may be varied, a lubricant storage reservoir formed in said movable member and adapted to receive a lubricant, a passage leading from said reservior to at least one of said surfaces and to said chamber, said passage constituting a communication through which fluid under pressure may flow from said lubricant reservoir in response to a reduction in the pressure of fluid in said chamber, means adapted to supply lubricant from said lubricant storage reservoir to the fluid which flows from the reservoir to said passage, a passage means for by-passing said passage and constituting a communication through which fluid under pressure may breathe into and out of said lubricant storage reservoir in response to variation in the pressure of fluid in said chamber, the latter communication being normally open and less restrictive than the former communication so as to divert the flow of fluid to the by-pass passage means, an inertia means operative upon a sudden change in the speed of said movable member as it is moved in response to the sudden reduction in the pressure of fluid in said chamber to render said by-pass passage means ineffective, so that fluid flows from the reservoir to the first mentioned passage.

3. In a piston device, the combination of a cylinder, a piston mounted in said cylinder to form a chamber at each side of said piston, said piston being reciprocable in response to variations in the pressure of fluid in one of said chambers, and a lubricating apparatus comprising a lubricant reservoir formed in said piston and adapted to contain lubricant, a passage leading from said reservoir to the periphery of said piston and to said chamber, means for conducting lubricant in said reservoir to said passage, said passage being adapted to conduct fluid and lubricant supplied thereto to the periphery of said piston upon a reduction in the pressure of fluid in said chamber, a second passage communicating with said reservoir and said chamber adapted to conduct fluid from said reservoir more freely than the first said passage, and valve means operative upon a sudden change in the speed of said piston induced by a sudden reduction in the pressure of fluid in said chamber to interrupt the flow of fluid under pressure from said reservoir to said second mentioned passage.

4. In apparatus for lubricating a friction surface of a movable member, in combination, a lubricant storage reservoir formed in said movable member and adapted to contain lubricant, means for maintaining said reservoir normally charged with fluid under pressure, two passages through which fluid under pressure contained in said reservoir may flow, means conducting lubricant in said reservoir to one of said passages which passage is adapted to carry lubricant from said means to said surface by fluid flowing from the reservoir, the other passage being normally open so that when fluid flows therethrough from said reservoir it will inhibit the flow of fluid through said one passage, and inertia means responsive to a sudden change in the speed of the movable member for closing communication between said reservoir and said other passage whereby fluid under pressure and thereby lubricant may flow through said one passage only.

5. In a lubricating apparatus of the type comprising a movable member having a surface to be lubricated, said member being provided with a lubricant storage reservoir and a lubricant conducting passage having associated therewith a lubricant carrying member and through which fluid under pressure may flow to thereby carry lubricant from said reservoir to said surface, in combination, means for maintaining said reservoir normally charged with fluid under pressure, another passage normally open to said reservoir and to said lubricant conducting passage for equalizing the pressure of fluid therein so that no effective amount of fluid flows through the lubricant conducting passage, and means operative upon a sudden change in the state of motion of said member for closing said other passage.

6. In a fluid pressure brake controlling valve device, of the type having a piston subject to opposing fluid pressures and having a normal brake release position and an emergency brake application position, said piston upon a sudden reduction in the pressure of fluid acting on one side thereof being operative from its normal brake release position to the emergency application position, in combination, a lubricant carrying reservoir formed in said piston and normally charged wtih fluid under pressure, a passage formed in said piston through which fluid under pressure may flow and carry lubricant from said reservoir to the friction surfaces of the piston, means supplied with lubricant from said reservoir and located in the path of flow of fluid from said reservoir to said passage for supplying lubricant to fluid which may flow from the reservoir to the passage, another passage formed in said piston leading from said reservoir to said first passage through which fluid may flow to equalize the pressure of fluid acting on opposite sides of said means, and valve means operative as an incident to the effecting of a sudden reduction in the pressure of fluid acting on one side of said piston for preventing the flow of fluid from said reservoir by way of said other passage.

SIDNEY G. DOWN.